May 13, 1952 A. G. FROST 2,596,231
VARIABLE-SPEED MECHANISM
Filed Jan. 29, 1951 3 Sheets-Sheet 2
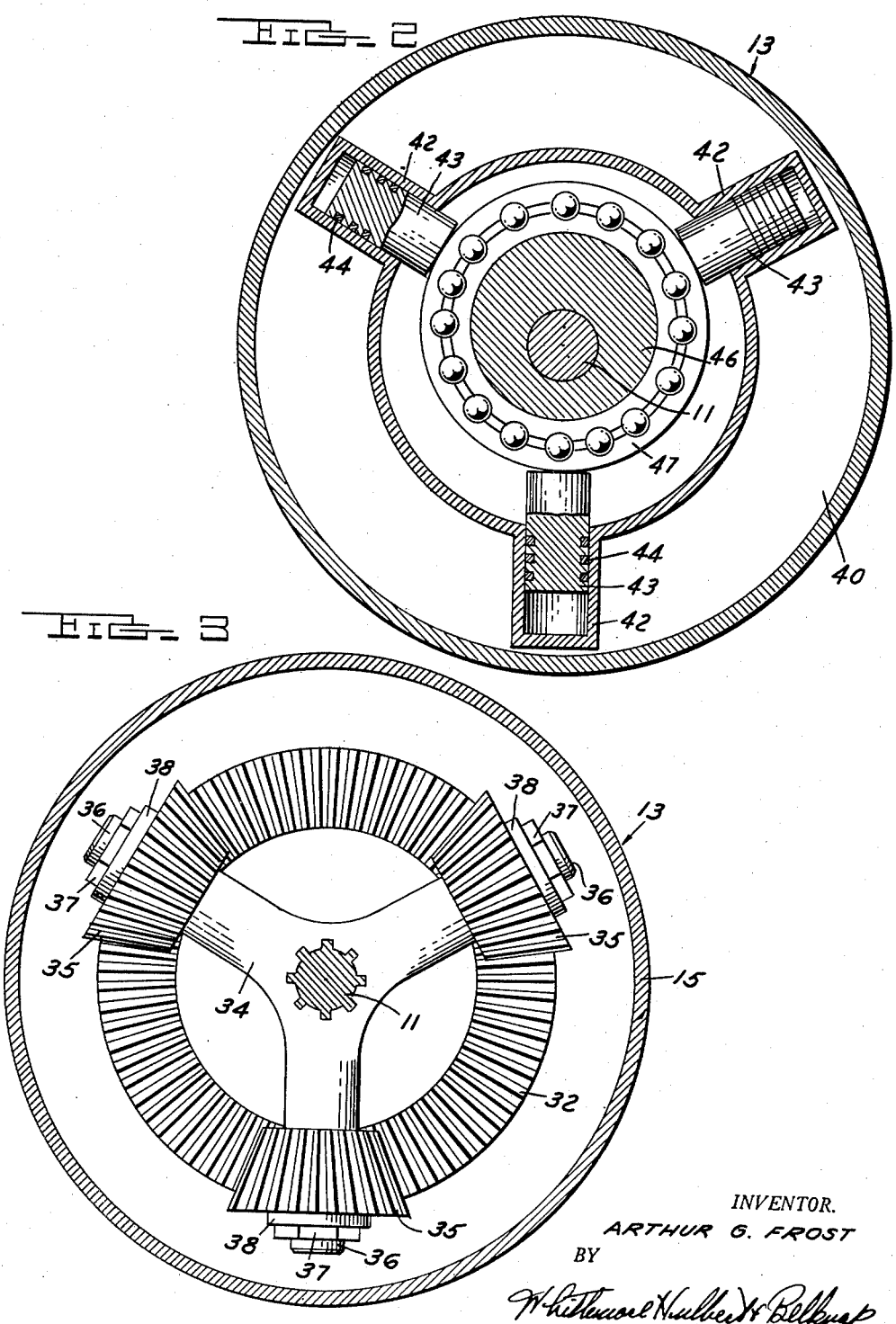
INVENTOR.
ARTHUR G. FROST
BY
*Whittemore Hulbert & Belknap*
ATTORNEYS May 13, 1952
A. G. FROST
2,596,231
VARIABLE-SPEED MECHANISM
Filed Jan. 29, 1951
3 Sheets-Sheet 3
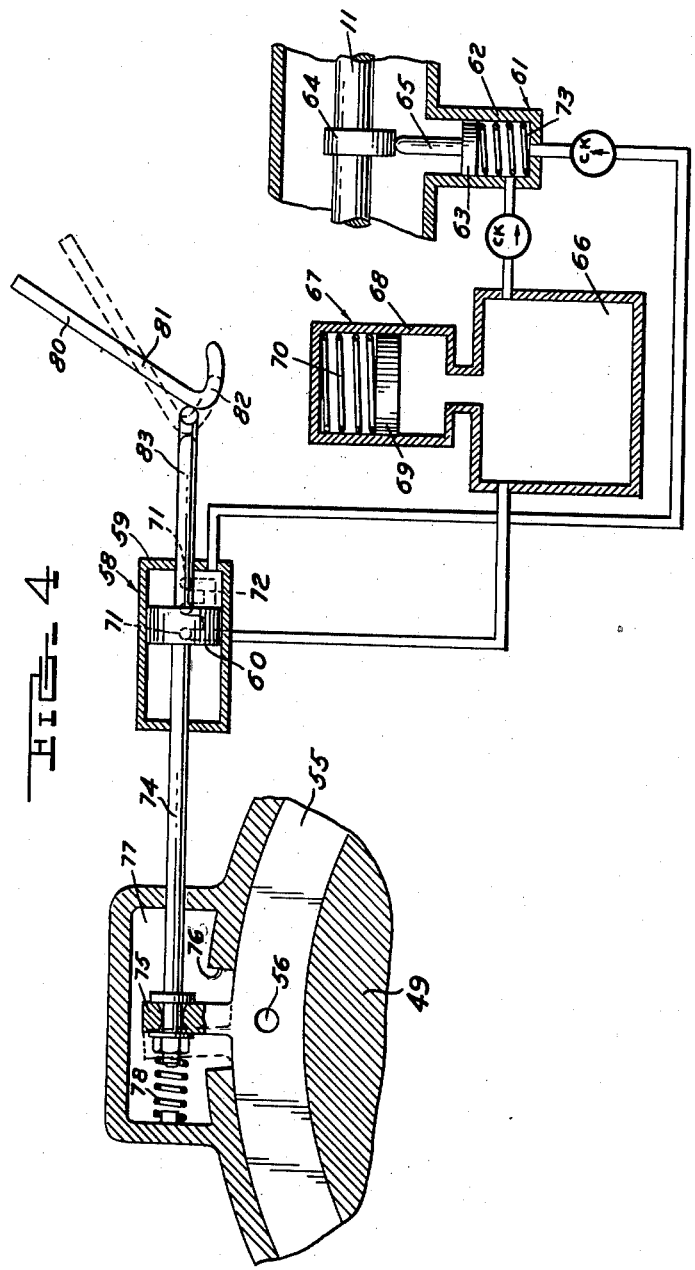
INVENTOR.
ARTHUR G. FROST
BY
ATTORNEYS Patented May 13, 1952

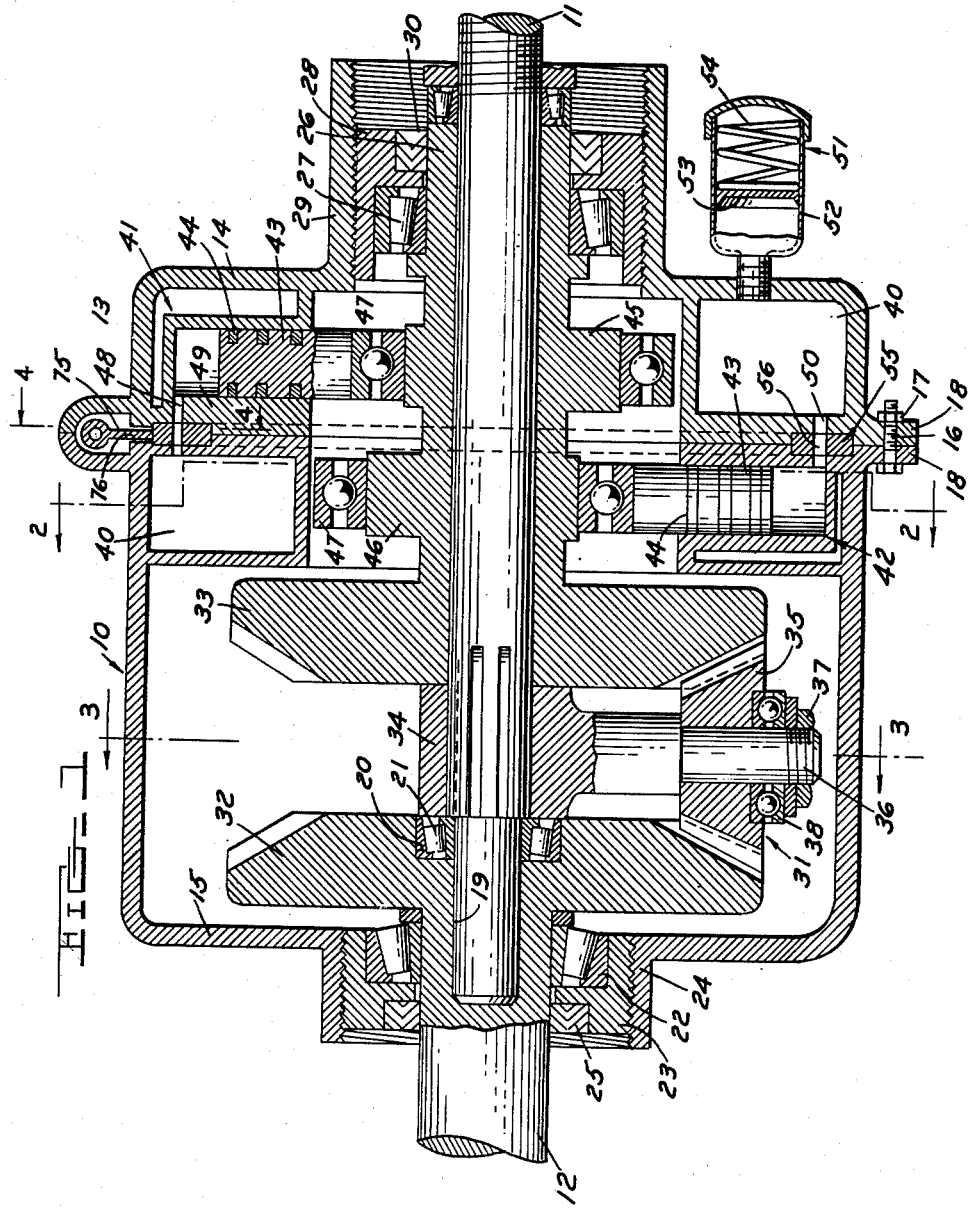

2,596,231

UNITED STATES PATENT OFFICE 2,596,231

VARIABLE-SPEED MECHANISM

Arthur G. Frost, Flint, Mich.

Application January 29, 1951, Serial No. 208,339

4 Claims. (Cl. 74—778)

This invention relates generally to variable speed driving mechanism, and refers more particularly to improvements in a torque converting coupling for connecting a drive shaft to a driven shaft.

It is an object of this invention to provide a coupling which affords effective torque conversion over a wide range of speeds without the assistance of change speed gearing and without loss of power due to slippage.

It is another object of this invention to provide a torque converter coupling having the above characteristics, and which in addition is composed of relatively few simple parts capable of being inexpensively manufactured, assembled and installed.

The foregoing as well as other objects will be made more apparent as this description proceeds, especially when considered in connection with the accompanying drawings, wherein:

Figure 1 is a longitudinal sectional view through variable speed mechanism comprising a torque converting coupling embodying the features of this invention;

Figures 2 and 3 are respectively cross sectional views taken on the planes indicated by the lines 2—2 and 3—3 of Figure 1; and Figure 4 is a sectional view taken on the line 4—4 of Figure 1 and showing semi-diagrammatically the fluid pressure means for operating the torque converter coupling.

Upon reference to Figure 1 of the drawings, it will be noted that the numeral 10 designates generally a variable speed driving mechanism in the form of a torque converter for coupling an engine driving shaft 11 to a driven shaft 12. The mechanism 10 comprises a casing 13 shown herein as formed of two sections 14 and 15 removably secured together by bolts 16 and nuts 17. In detail it will be noted that the adjacent ends of the casing sections are respectively formed with radially outwardly extending attaching flanges 18 having aligned openings therethrough at circumferentially spaced points for respectively receiving the bolts 16. In practice it may be necessary to provide a sealing gasket (not shown) between adjacent faces of the flanges 18 to prevent the escape of fluid from the interior of the casing 13.

The drive shaft 11 extends axially through the casing 13 and the front wall of the casing is apertured to receive the drive shaft 11. The driven shaft 12 projects into the casing 13 through an opening in the rear wall of the casing, and is formed with a bore 19 extending axially from the front end thereof to receive the rear end of the drive shaft 11. If desired the rear end of the bore 19 may be counterbored as at 20 to receive a roller bearing 21 for the drive shaft 11.

The driven shaft 12 is journalled in a bearing 22 supported in an adjustable carrier 23. The carrier 23 is in turn supported in a hub 24 formed on the rear wall of the casing 13 and fashioned to support a sealing ring 25 at the rear side of the bearing 22. The sealing ring 25 frictionally engages the driven shaft 12 and prevents the escape of fluid out of the casing 13 along the shaft 12.

Rotatably supported on the drive shaft 11 within the casing 13 is an intermediate shaft 26 having the front end journalled in a bearing 27. The bearing 27 is mounted in a carrier 28 and the latter in turn is secured within a hub 29 formed on the front wall of the casing 13. It will also be noted from Figure 1 of the drawings that the carrier is fashioned to provide a support for a sealing ring 30 which is positioned to engage the intermediate shaft 26 axially forwardly of the bearing 27, and thereby prevent the escape of fluid from the interior of the casing 13 along the intermediate shaft.

The drive shaft 11 is connected to the driven shaft 12 and intermediate shaft 26 throughout the medium of differential gearing 31. The differential gearing 31 has a ring gear 32 located within the casing 13 and secured to the front end of the driven shaft 12. A second ring gear 33 is also located within the casing 13 and is secured to the rear end of the intermediate shaft 26. The two ring gears are connected by a carrier 34 and a plurality of pinions 35. The carrier 34 is splined on the drive shaft 11 between the ring gears, and is provided with radially outwardly extending shafts 36 spaced equal distances from each other circumferentially of the carrier 34. As shown in Figure 3 of the drawings, three shafts 36 are provided on the carrier 34, and the radial axes of these shafts are spaced 120° from each other. The pinions 35 are respectively journalled on the shafts 36 and are held against displacement in a radially outward direction by clamping nuts 37 respectively threaded on the outer ends of the shafts 36. Suitable thrust bearings 38 are respectively supported on the shafts 36 between the nuts 37 and the adjacent sides of the pinion 35.

Referring now more in detail to Figures 1 and 2 of the drawings, it will be noted that an annular reservoir 40 for hydraulic fluid medium is formed within the casing, and also that two banks of cylinders 41 and 42 are formed within the casing 13. For the purpose of illustration one part of the reservoir 40 is shown as formed in section 14 of the casing, and the other part is shown as formed in the section 15 of the casing. Also for the purpose of illustration the part of the reservoir 40 in the casing section 14 is fashioned to form the bank of cylinders 41, and the part of the reservoir 40 formed in the casing section 15 is fashioned to form the bank of cylinders 42. The arrangement is such that the cylinders actually extend into the reservoir.

In any case the cylinders are spaced from each other axially of the drive shaft 11 and the axes of the cylinders extend radially with respect to the drive shaft 11. In detail the axes of the cylinders in the bank 42 are spaced equal distances from each other circumferentially of the drive shaft 11 and the radially inner ends of the cylinders open into the casing 13. The cylinders in the bank 41 also have their axes spaced equal distances from each other around the drive shaft 11 and the radially inner ends of these cylinders also open into the interior of the casing 13. In practice, it is preferred to arrange the two bands of cylinders so that the cylinders in the bank 41 are positioned midway between the cylinders in the bank 42.

Respectively slidably supported in each of the cylinders of the two banks are pistons 43 equipped with the usual sealing rings 44. The radially inner ends of the pistons 43 project inwardly through the open inner ends of the cylinders, and are engaged by suitable operating means to be presently described. The operating means comprises a pair of cams 45 and 46 in the form of eccentrics having cylindrical peripheral surfaces on which anti-friction bearings 47 are mounted. The anti-friction bearing 47 on the cam 45 engages the radially inner ends of the pistons 43 in the bank of cylinders 41, and the anti-friction bearings 47 on the cam 46 engage the radially inner ends of the pistons 43 in the bank of cylinders 42. The eccentrics 45 and 46 are preferably arranged 180° out of phase, as shown in Figure 1 of the drawings.

It will also be noted from Figure 1 of the drawings that the outer ends of the cylinders in the bank 41 communicate with the reservoir 40 through the medium of ports 48 which extend through the wall 49 between the two banks of cylinders. The outer ends of the cylinders in the bank 42 communicate with the reservoir 40 through similar ports 50 extending through the wall 49.

In the present instance the reservoir and cylinders in both banks are filled with a hydraulic fluid medium, and this fluid medium is maintained under pressure by a spring operated device 51. This device comprises a cylinder 52 communicating at one end with the interior of the reservoir 40 and having a piston 53 slidably supported therein. The piston is normally urged in a direction to displace fluid from the cylinder 52 into the reservoir by a coil spring 54 supported in the cylinder 52 at the rear side of the piston 53. The pressure supplied by the device 51 is sufficient to maintain the radially inner ends of the pistons in contact with their respective cam bearings 47.

It follows from the above that radially outward movement of the pistons 43 in their respective cylinders displaces fluid medium from the cylinders into the reservoir through the ports 48 and 50. In the present instance the flow of fluid meduim through the ports 48 and 50 is metered or controlled by a valve 55 in the form of a ring having a plurality of passages or openings 56 therethrough registerable with the ports 48 and 50. The ring is positioned in concentric relation to the drive shaft 11 and is rotatably supported in a recess formed in the dividing wall 49.

The above arrangements is such that when the ring is in a position to register the openings 56 with the passages 48 and 50, very little restriction is provided for the displacement of fluid from the cylinders into the reservoir. This may be considered the idling position wherein the ring gear 32 on the driven shaft 12 is stationary or substantially so. Also the arrangement is such that in the above idling position the intermediate shaft 26 is rotated through the differential gearing 31 at approximately twice the speed of the engine drive shaft 11. However, when the valve 55 is rotated to retard the rate of displacement of fluid medium from the cylinders into the reservoir 40 through the ports 48 and 50, resistance is offered to rotation of the intermediate shaft 26. Accordingly the ring gear 32 on the driven shaft 12 rotates at a speed depending upon the resistance imparted to the intermediate shaft or upon the restriction offered to the displacement of fluid from the cylinders into the reservoir 40. In other words, the ratio of the drive between the drive shaft 11 and the driven shaft 12 is reduced in proportion to the restriction offered to the displacement of fluid medium from the cylinders into the reservoir 40 until the ports 48 and 50 are completely closed by the valve 55, at which time a one to two ratio drive is accomplished.

The valve 55 is rotated in response to the speed of rotation of the drive shaft 11, and this is accomplished by a fluid motor 58 shown in Figure 4 of the drawings. The fluid motor comprises a cylinder 59 and a piston 60 slidably supported in the cylinder. The front end of the cylinder communicates with the pressure side of a pump 61 having a cylinder 62 and a piston 63 slidably supported in the cylinder. In the present instance the piston is operated by a cam 64 secured to the drive shaft 11 and engageable with a projection 65 on the piston 63.

The cylinder 62 below the piston 63 communicates with a reservoir 66 containing a supply of hydraulic fluid medium which is maintained under pressure by a device 67. The device 67 comprises a cylinder 68 and a piston 69 slidably supported in the cylinder 68. The lower end of the cylinder 62 is shown as communicating with the interior of the reservoir 66, and the piston 63 is normally urged in a direction to apply pressure on the fluid in the reservoir 66 by a coil spring 70. The coil spring 70 is located in the cylinder 68 between the piston 69 and the top wall of the cylinder.

The reservoir communicates with a plurality of relief openings 71 formed in the cylinder 59 and connected by a passage 72. These relief openings 71 prevent sudden forward movement of the piston 60 in the cylinder 62 and control the rate of forward movement of the piston 60. It is also pointed out herein that the projection 65 on the pump piston 63 is actually maintained in contact with the cam 64 by the pressure of the fluid in the reservoir 66. However if desired, a spring 73 may be provided for yieldably maintaining the projection 65 in operative engagement with the cam 64.

The piston 60 is connected to the valve 55 by a rod 74 having the front end connected to the piston 60 and having the rear end connected to a projection 75 on the valve ring 55. It will be noted from Figure 4 that the projection 75 extends upwardly through a slot 76 formed in the casing 13, and that the slot is elongated circumferentially of the casing to enable the required rotation of the valve ring 55. In the present instance the slot 76 as well as the projection 75 is enclosed in a housing 77 which is formed by fashioning the flanges 18 in the manner clearly shown in Figure 1 of the drawings. Movement of the valve ring by the piston 60 is yieldably resisted by a coil spring 78 having one end engaging the rod 74 and having the other end abutting the adjacent end wall of the housing 77.

It follows from the foregoing that the pump 61 is operated in response to the speed of rotation of the drive shaft 11 to introduce fluid under pressure into the cylinder 59 at the front side of the piston 60. As a result the piston 60 is moved rearwardly against the action of the spring 78, and the valve 55 is rotated in a direction to close or reduce the effective cross sectional areas of the ports 48 and 50. In other words the valve 55 operates to restrict the displacement of fluid from the banks of cylinders 41 and 42 into the reservoir 40, with the result that the ratio between the drive shaft 11 and the driven shaft 12 is reduced. On the other hand when the load on the driven shaft is increased, or when the speed of the drive shaft 11 is reduced, the pressure supplied by the pump 61 is reduced, with the result that the valve 55 is moved by the spring 78 in a direction to open the ports 48 and 50 to the reservoir 40. Thus the ratio between the drive shaft 11 and the driven shaft is increased.

In order to facilitate initial operation when the parts are in their idling position, provision is made herein for slightly closing the valve 55 manually. Referring again to Figure 4 it will be noted that the numeral 80 designates a control which may be in the form of an accelerator pedal. This control is shown as pivoted at 81 for swinging movement intermediate its ends. A cam 82 is provided on the lower end of the control for engagement with an extension 83 on the rod 74. The extension 83 extends forwardly from the piston, and the arrangement is such that when the accelerator is pressed downwardly to open the throttle of the engine (not shown) the rod 74 is moved sufficiently in a rearward direction to slightly close the ports 48 and 50.

It will be observed from the foregoing that I have provided a relatively simple and inexpensive torque converter coupling which operates to supply torque coversion over a wide range with a minimum slippage. It will also be noted that the torque converter coupling may be used without the assistance of variable speed gearing, or may be used in conjunction with such gearing.

What I claim as my invention is:

1. Variable speed driving mechanism having in combination a drive shaft, a driven shaft supported for rotation relative to the drive shaft, an intermediate shaft supported for rotation relative to both the drive and driven shafts, two groups of cylinders spaced from each other axially of the intermediate shaft, the cylinders in each group being distributed around the intermediate shaft with their axes extending radially with respect to the axis of the intermediate shaft, a reservoir for fluid communicating with the cylinders through the medium of ports concentrically arranged with respect to the intermediate shaft, pistons respectively slidably mounted in the cylinders and movable outwardly to displace fluid from the cylinders into the reservoir, a cam on the intermediate shaft for operating the pistons in one group of cylinders, a second cam on the intermediate shaft for operating the pistons in the other group of cylinders, means for controlling the flow of fluid through the ports in said cylinders including a ring supported for rotation between the groups of cylinders in concentric relation to the intermediate shaft and having openings therethrough respectively registerable with said ports upon rotation thereof relative to the groups of cylinders, and differential gearing connecting the drive shaft to the intermediate shaft and to the driven shaft.

2. The variable speed driving mechanism defined in claim 1 wherein the eccentric of the cam for operating the pistons in one group of cylinders is angularly offset with respect to the eccentric of the cam for operating the pistons in the other group of cylinders.

3. The variable speed driving mechanism defined in claim 1 wherein the cylinders in both groups are spaced equal distances from each other about the axis of the intermediate shaft with the axes of the cylinders in one group angularly offset with respect to the axes of the cylinders in the other group, and wherein the eccentric portions of the two cams are also angularly offset with respect to one another.

4. The variable speed driving mechanism defined in claim 1 having a fluid pressure operated motor connected to the ring for rotating the latter and having a pump driven by the drive shaft for operating the fluid motor.

ARTHUR G. FROST.

REFERENCES CITED

The following references are of record in the file of this patent:

UNITED STATES PATENTS

| Number | Name | Date |
| --- | --- | --- |
| 2,064,295 | Crane | Dec. 15, 1936 |
| 2,278,351 | Havens | Mar. 31, 1942 |
| 2,372,702 | Armentrout | Apr. 3, 1945 |

FOREIGN PATENTS

| Number | Country | Date |
| --- | --- | --- |
| 198,271 | Great Britain | May 31, 1923 |
| 239,955 | Great Britain | Sept. 24, 1925 |
| 305,016 | Italy | Jan. 24, 1933 |
| 325,093 | Italy | Feb. 28, 1935 |
| 927,902 | France | Nov. 13, 1947 |